(12) United States Patent
Momot et al.

(10) Patent No.: US 10,180,867 B2
(45) Date of Patent: Jan. 15, 2019

(54) SYSTEM AND METHOD FOR BRUTEFORCE INTRUSION DETECTION

(71) Applicant: LEVIATHAN SECURITY GROUP, INC., Seattle, WA (US)

(72) Inventors: Falcon Momot, Seattle, WA (US); Lorne Schell, Calgary (CA); Duncan Smith, Seattle, WA (US)

(73) Assignee: Leviathan Security Group, Inc., Seattle, WA (US)

(*) Notice: Subject to any disclaimer, the term of this patent is extended or adjusted under 35 U.S.C. 154(b) by 29 days.

(21) Appl. No.: 14/737,309

(22) Filed: Jun. 11, 2015

(65) Prior Publication Data

US 2016/0004580 A1 Jan. 7, 2016

Related U.S. Application Data

(60) Provisional application No. 62/010,851, filed on Jun. 11, 2014.

(51) Int. Cl.
| | |
|---|---|
| *G06F 11/07* | (2006.01) |
| *G06F 21/55* | (2013.01) |
| *H04L 29/06* | (2006.01) |

(52) U.S. Cl.
CPC ........ *G06F 11/076* (2013.01); *G06F 11/0706* (2013.01); *G06F 11/0721* (2013.01); *G06F 21/554* (2013.01); *H04L 63/1416* (2013.01); *G06F 2221/034* (2013.01)

(58) Field of Classification Search
CPC . H04L 9/32; G06F 11/00; G06F 21/00; G06F 11/07; G06F 7/04; G06F 21/55; G01N 21/31; G01N 21/35
USPC ........ 726/22–26; 713/187–189, 190; 705/76; 356/326; 250/339.09, 339.12; 702/22, 702/30; 714/26, 39
See application file for complete search history.

(56) References Cited

U.S. PATENT DOCUMENTS

| | | | | |
|---|---|---|---|---|
| 5,046,846 A | * | 9/1991 | Ray | G01N 21/35 250/339.09 |
| 7,913,306 B2 | * | 3/2011 | Apap | G06F 21/552 726/22 |
| 8,230,262 B2 | * | 7/2012 | Li | G06F 11/008 714/26 |
| 8,712,596 B2 | * | 4/2014 | Scott | G06F 21/55 700/297 |
| 9,009,818 B2 | * | 4/2015 | Tuvell | G06F 21/56 713/187 |

* cited by examiner

*Primary Examiner* — Thanhnga B Truong
(74) *Attorney, Agent, or Firm* — Vernon Francissen (57) ABSTRACT

Systems and methods are shown for detecting potential attacks on a domain, where one or more servers, in response to a failure event, obtain a lambda value from a baseline model of historical data associated with a current time interval corresponding to the failure event, determine a probability of whether a total count of failure events for the current time interval is within an expected range using a cumulative density function based on the lambda value, and identify a possible malicious attack if the probability is less than or equal to a selected alpha value.

18 Claims, 8 Drawing Sheets

SYSTEM AND METHOD FOR BRUTEFORCE INTRUSION DETECTION

CROSS REFERENCE TO RELATED APPLICATIONS

This application claims the benefit of U.S. Provisional Patent Appl. No. 62/010,851 for "System and Method for Brute Force Intrusion Detection" filed Jun. 11, 2014, herein incorporated by reference in its entirety for all purposes.

GOVERNMENT LICENSE RIGHTS

This invention was made with government support under FA8750-12-C-0161 awarded by the Air Force Research Laboratory. The government has certain rights in the invention.

BACKGROUND

Computer networks and the devices and services that reside on them are often the subject of attacks by parties that are attempting to improperly access information and resources or to introduce malicious code to the networks. Some approaches for gaining access to restricted devices and resources on a network involve repeated attempts to access a single machine, machines of a particular subdomain, or the entire system known to the attacker, which typically results in a high number of failed attempts. This is commonly known as brute force intrusion.

SUMMARY

According to one aspect of the present invention, a system for detecting potential attacks on a domain is shown involving one or more servers that are configured to, in response to a failure event, obtain a lambda value from a baseline model of historical data associated with a current time interval corresponding to the failure event and determine a probability of whether a total count of failure events for the current time interval is within an expected range using a cumulative density function based on the lambda value. The system will identify a possible malicious attack if the probability is less than or equal to a selected alpha value.

In one refinement, the system obtains a hierarchical domain model corresponding to a domain affected by the failure event. The system traverses the hierarchical domain model from a first level towards a second level, where the second level is more specific than the first level, and, for each level of the hierarchical domain model, determines the probability of whether the total count of failure events for the current time interval and the current level of the hierarchical domain model is within the expected range using the cumulative density function based on the lambda value. The system then identifies at least one level of the hierarchical domain as a locus of the potential malicious attack.

In other refinements, the system permits the baseline model of historical data to be set to predetermined values, such as initial values before sufficient historical data is available or when domains are changed and the historical data is less relevant to the new structure. In still another refinement, the system creates the baseline model of historical data from event logs and allocates failure events from the logs to corresponding strata of the baseline model. In a further refinement, the strata are selected to correspond to time intervals having similar recurring levels of failure events. In another refinement, the baseline model of historical data is updated in response to failure events.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In an attack where failure is a possibility due to unreliability of code placement or limited knowledge of the target, attackers will require multiple attempts. This attack may target a single machine, machines of a particular subdomain, or the entire system known to the attacker. By understanding the probability of a software failure under non-malicious circumstances within various domains, it is possible to model the expected rate of failure and detect significant differences in failure rates, which may indicate that a brute-force attack is in progress.

Similarly, given a scenario where an attacker is attempting to extract information from a service through positive confirmation, many combinations of input into this service may be attempted. The ability to detect this malicious trial and error approach to compromising information security requires an accurate understanding of the probability of a non-malicious attempt.

One aspect of the invention relates to identifying suitable time intervals and iterating through time interval segments to create a model of historical baseline data for a domain, such as periodic time intervals and concrete time intervals of fixed interval-segment count. Another aspect of the present invention relates to building a historical data model that supports queries against domain and subdomain combinations and queries for selecting data for time intervals for domain and subdomain combinations. Yet another aspect of the invention relates to establishing dynamically updated historical baseline data. Still another aspect of the invention relates to applying statistical analysis using a Poisson distribution whereby a current crash artifact rate is compared against an average historical rate to determine whether the current rate of crashes, as of the most recent one, is anomalous and, thus, may be malicious. An additional aspect of the invention relates to using a Poisson cumulative distribution function test that is conducted against baseline data obtained from a variety of correlative metadata items and domains of specificity and testing for an improbable event in each domain level. Embodiments of the present invention may relate to some or all of these aspects of the present invention.

Figure 1:
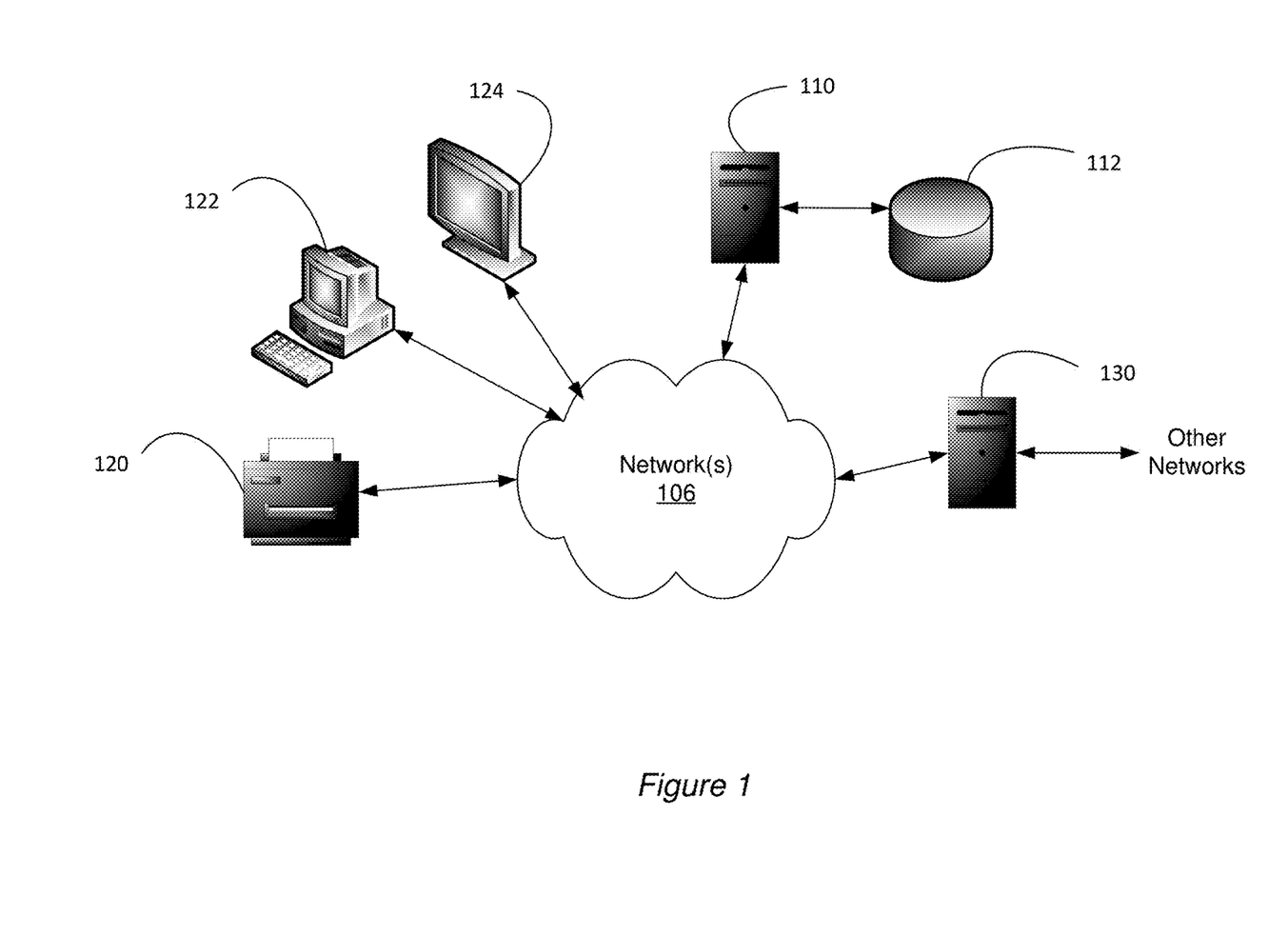
FIG. 1 is a schematic diagram depicting an example of a computer network based system that may be subject to a brute force intrusion attack and may be suitable for utilization of certain aspects of the present invention.

FIG. 1 is an architecture diagram that depicts aspects of an example of a computer network system with communication among multiple devices. In this example, network 106, which can be one network or multiple networks, provides communication between server 110 connected to database 112 and several client devices, such as printer 120, personal computer 122, and interactive terminal 124. The architecture of FIG. 1 is a simplified representation of an enterprise environment having a multitude of different computing devices that may represent a target for a brute force intrusion attack. A gateway 130 provides a communications link between the network 106 and other networks, such as the internet, through which an attacker may launch an attack.

Figure 2:
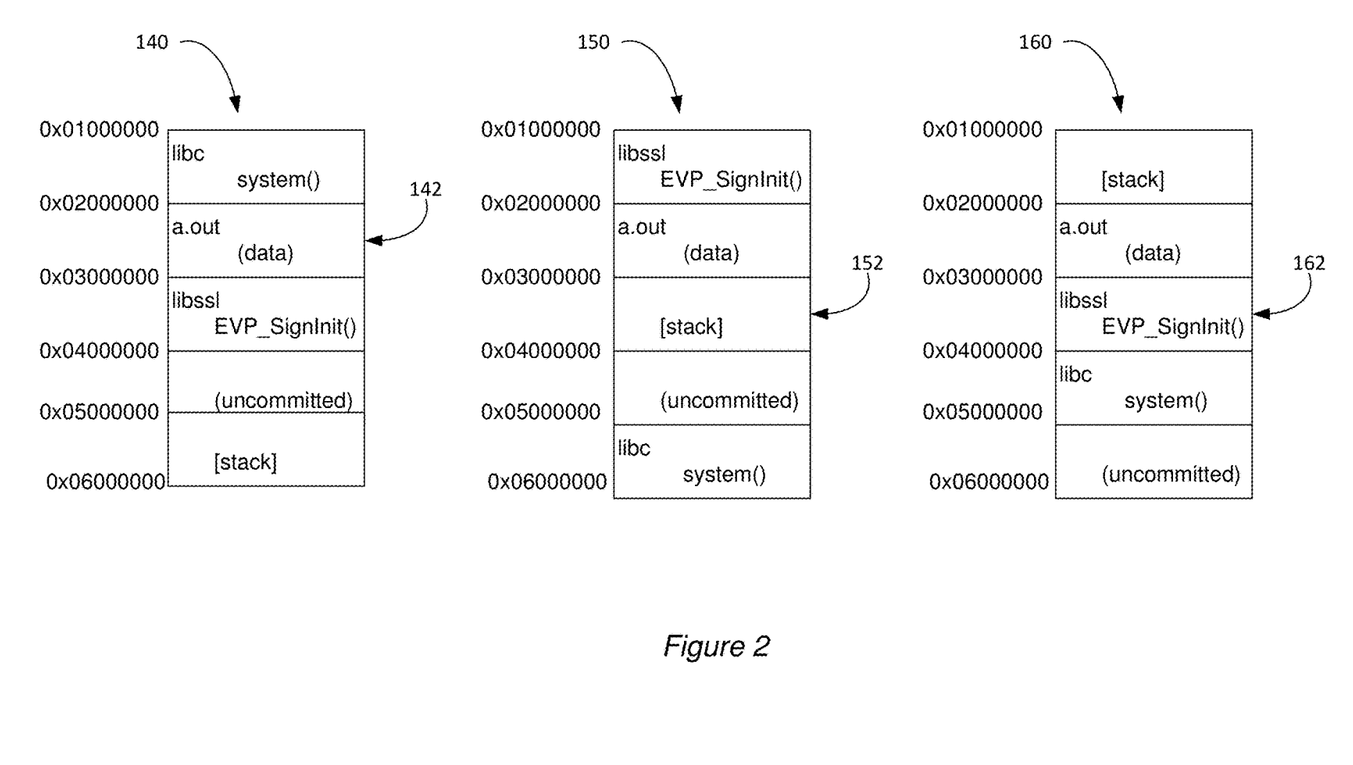
FIG. 2 is a schematic diagram illustrating several examples of brute force attacks on program memory organized using address space layout randomization (ASLR) to illustrate certain aspects of the present invention.

FIG. 2 is a schematic diagram illustrating three simplified examples of different types of brute force intrusion attacks that may occur. The examples shown illustrate a return-to-libc type attack in which a return address on the call stack is replaced by the address of a function that is already in the executable binary or in a shared library, where an attacker attempts to create a buffer overflow that results in program execution proceeding to the function at the return address. Although the attacker could attempt to cause the code to return to any address, frequent targets are shared libraries that are highly likely to be linked to the program, e.g. libc, and have function calls with only one argument, e.g. system( ) Another similar type of attack is a return-to-plt where the attacker uses Procedure Linkage Table (PLT) functions loaded into the binary.

Each of the examples 140, 150 and 160 illustrate different program images in memory, each with modules at different locations in memory. Note that the program image content has been highly simplified for clarity in these examples. The effects of ASLR (Address Space Layout Randomization) have caused the base addresses of most code modules to vary across the images. An attacker has redirected execution in each instance to an execution point indicated by an arrow in an attempt to employ the ret-to-libc type attack to call the library function system( ) in libc. In example 140, execution address 142 falls within a data block within the module a.out, which will cause the program to crash when it attempts to execute data because execution of data is prohibited by the operating system. In example 150, execution address 152 falls within the stack and the program will again crash when it attempts to execute because execution in the stack is also prohibited. In example 160, however, the execution address 162 falls within the system( ) function in library libc, where execution proceeds and the attack is successful. Even though the use of ASLR has introduced uncertainty as to the libc address, the attacker's use of a brute force technique with repeated attempts is eventually able to work around it, but typically only after a number of program crashes.

The examples of FIG. 2 are highly simplified. In an actual actively executing system, the number of failed attempts necessary to bypass ASLR would typically be much larger. If the attacker targets multiple systems with the expectation of multiple successes, the number of failed attempts will likely be greater still, since success and failure are generally proportional due to the random uniform distribution of successes, which results from the similar distribution of libc base addresses employed by the mitigation. Other examples of similar attack techniques include a stack cookie brute force, and, more divergently, attempts to use exploits with strong software version or build dependencies in a relatively heterogeneous environment.

In certain aspects of the present invention, an accurate model of non-malicious attempts to use a service that result in failure is developed. The accuracy of the model depends upon a number of factors being accounted for. In one example, these factors are time oriented and depend on regular use of the system through holidays, weekends, business hours and other calendar time cycles and intervals. Because user activities tend to be cyclic over time, certain embodiments of the invention stratify the incidence of crash artifacts over a time period (such as a particular group of hours on each business day). A comparison of the rate of incidence of crash artifacts between different strata, e.g. time/date intervals, is not normally useful. However, a comparison of crash artifact incidence rates across different instances of the same stratum is useful for discerning an elevated failure rate due to malicious activity from a baseline non-malicious failure rate.

Figure 3:
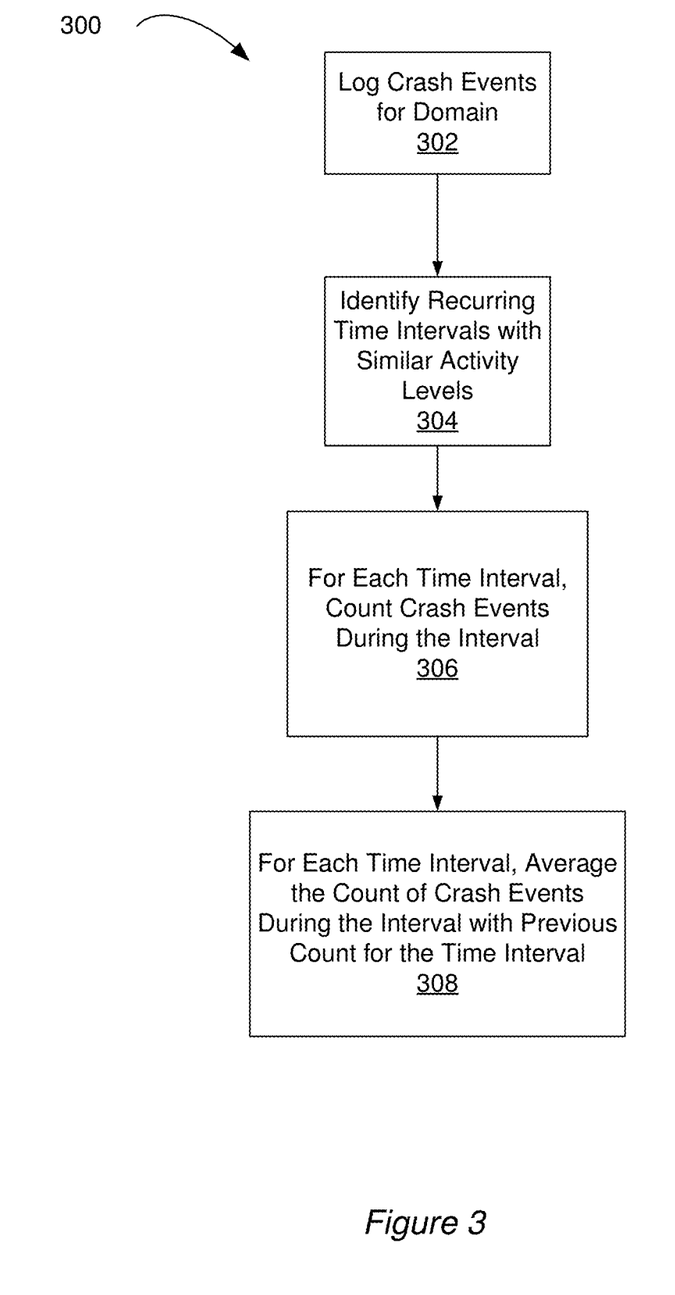
FIG. 3 is a control flow diagram illustrating the steps or stages of one exemplary process that may be performed to construct a historical baseline model of non-malicious crash artifacts in accordance with certain aspects of the invention.

In certain embodiments of the present invention, a historical baseline of non-malicious crash artifacts (whose non-maliciousness is, for example, determined by metadata computed by other methods) is dynamically created for multiple time periods for each domain under consideration. FIG. 3 is a control flow diagram illustrating one example of a process 300 for creating a baseline model of crash events in a domain, e.g. network, subnet, system. Crash events for the domain are logged over time at step 302. The log data is used to identify time intervals with similar recurring levels of activity at step 304. For example, a domain or system may experience low activity during week nights, a surge around the beginning of the work day, moderate activity during the middle of the day, and another surge of activity at the close of the workday. If this is a consistent pattern across multiple days, weeks, etc., then a time interval that corresponds to these periods is established, e.g. Monday from 0700 to 0900. For each time interval, the number of crash events that occurs during the interval is counted at step 306. In this example, the count of crash events is averaged with the previous data for the time interval, e.g. the same interval the previous week, month, year, etc.

Figure 4:
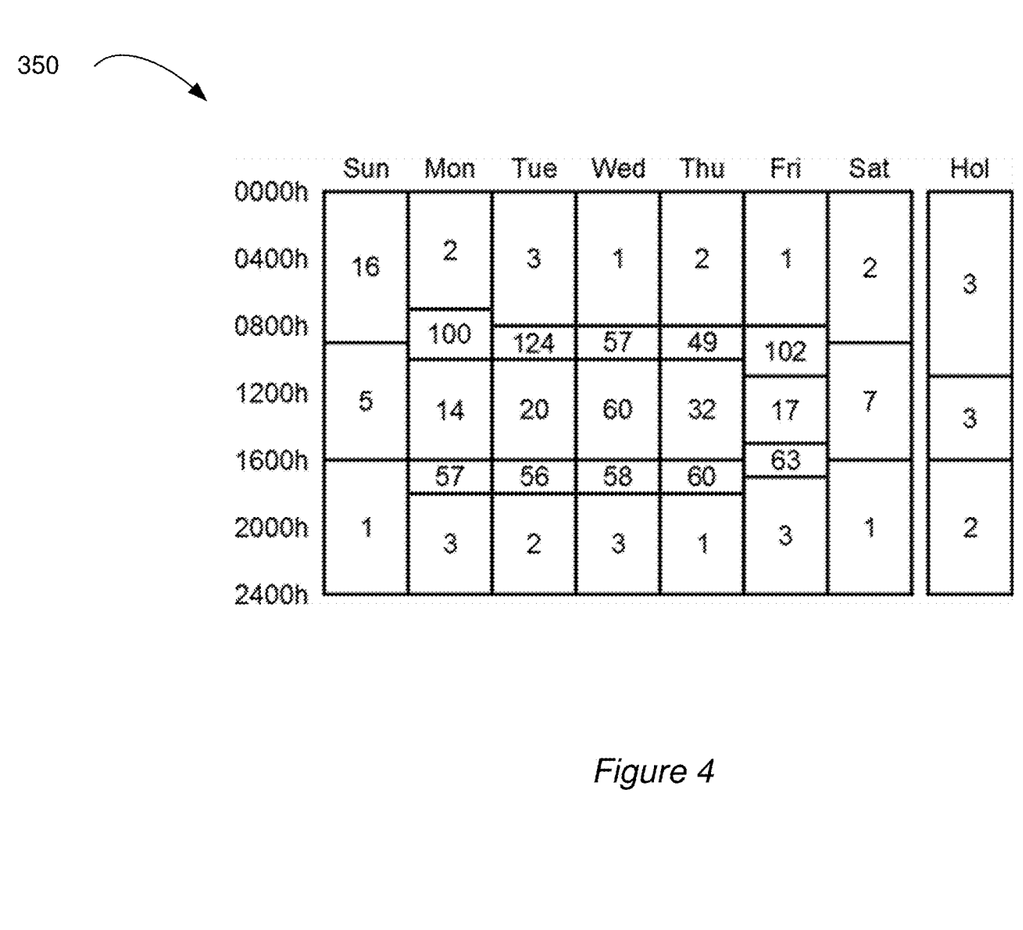
FIG. 4 is a schematic diagram illustrating an example of a historical baseline model of non-malicious crash artifacts in accordance with certain aspects of the invention.

FIG. 4 is a schematic diagram illustrating an example of a historical baseline model 350 developed for a given domain. The value in each cell is the median count of crash events which occur within that particular stratum, e.g time interval. The data depicted in the example can be calculated by querying a database of events for all events in that stratum and domain, grouping by day. In this example, the historical baseline shows a historical average for Sunday of 16 crash events between midnight and 0900, 5 crash events between 0900 and 1600, and 1 crash event between 1600 and midnight. Similarly, the baseline model shows a historical average for Monday of 2 crash events between midnight and 0700, 100 crash events between 0700 and 1000, 14 crash events between 1000 and 1600, 57 crash events between 1600 and 1800, and 3 crash events between 1800 and midnight. The model 350 includes separate historical data for intervals in each week day, each weekend day, and holidays. It may be observed in the baseline model 350 that the historical crash data varies significantly from day to day and between intervals of the same day. Other domains will likely have different baseline model data.

Figure 5:
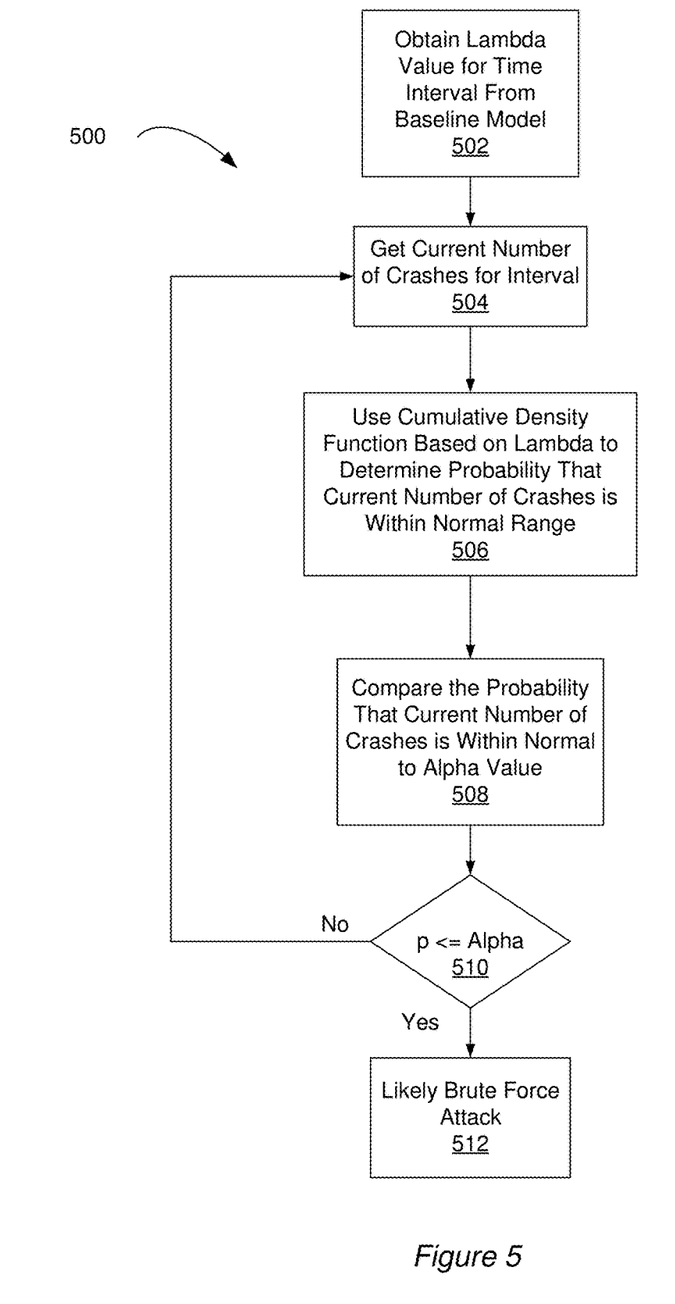
FIG. 5 is a control flow diagram illustrating the steps or stages of one example of a process for detecting a possible brute force attack using data from a historical baseline model of non-malicious crash artifacts in accordance with certain aspects of the invention.

The model 350 shown in FIG. 4 is for days of the week with an exception for holidays. It is also possible to create a similar chart over an entire year (rather than a week) and create arbitrary equivalency classes for days. The model in FIG. 5 is most appropriately viewed as an annually-periodic chart with equivalency classes for all holidays, and then for each weekday (excluding holidays). In one embodiment, an interface is provided for queries against subdomain combinations and queries selecting data across smaller or larger timeframes, e.g. months or years. For example, the stratum selected for the historical model may be determined from querying event data to identify recurring time intervals with similar levels of failure events. In another embodiment, data from other systems may be utilized to revise the data in the historical model, such as removing data introduced by a known anomaly.

FIG. 5 is an example of a process 500 for detecting a possible brute force attack using historical baseline data. In this example, the historical baseline data from baseline model 350 is used to obtain the lambda value from the current stratum, e.g. present time interval, for a Poisson distribution at step 502. The lambda-value is derived by dividing the stratum median by the number of time units (hours) comprising the time period. At step 504, the current count of crashes for the interval is obtained from, for example, an event log for the domain. At step 506, a Poisson cumulative density function determined from the lambda value for the stratum is used to determine the probability of at least as many crashes occurring as have so far occurred in the current time period and domain excluding the activity of malicious actors, and the current instance of the time period. The result of the Poisson cumulative density function is compared against an alpha value at step 508. If the probability of the observed crashes, which may include crashes due to malicious activity, in the current instance of the time period is less than the alpha value, then an active brute force attack is deemed to be likely and control flow branches to step 512. If the probability of the observed crashes remains above the alpha value, then control flow branches to step 504 to get the current number of crashes and repeat the check.

When the current stratum or interval changes, e.g. expires, then process 500 is undertaken for monitoring activity in the subsequent stratum.

Many of the components of the example of FIG. 1 represent examples of domains that may be subject to attack. A domain can typically be identified from metadata. Several pieces of metadata that may be used to establish domains include: IP address and subnet, node Fully Qualified Domain Name (FQDN), crashing program image name or loaded modules. The process 500 of FIG. 5 may, for example, be conducted for each domain or set of metadata, in order of decreasing specificity. The accuracy of brute force attack detection may be improved by concentrating on more tightly correlated domains, e.g. department or program, making positive hits more likely and more specific. In one example, if a crash event occurs, the period rate or event count will be evaluated for the name of the program being executed, the node on which the crash occurred, the /24 subnet on which the crash occurred, and then the entire enterprise, in that order. The first of these domains to raise an anomaly, e.g. a brute force attack is indicated as likely in process 500, will cause processing to stop and an anomaly to be reported, e.g. at step 512.

Figure 6:
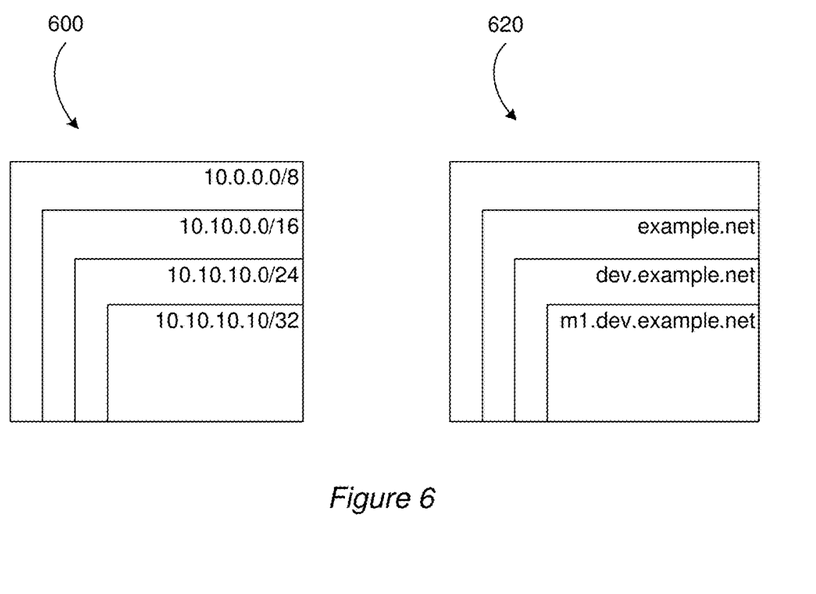
FIG. 6 is a schematic diagram depicting two examples of classifier domains that may be appropriate for application of certain embodiments of the present invention.

FIG. 6 is a schematic diagram illustrating two examples of classifier domains that may be appropriate for application of certain embodiments of the present invention. In the example 620, the hierarchy is identical to that of DNS names and domains, starting with the root under which all nodes lie, down the hierarchy in an increasing level of specificity, to example.net, then to dev.example.net and, finally to a single service m1.dev.example.net, skipping the irrelevant distinction at the top-level domain, e.g. "net". The example 600 illustrates the same type of subset domains, but with subnetting, which proceeds progressively from a /8 block by 8-bit divisions from the most general level to increasingly specific levels, i.e. 10.0.0.0/8 to 10.10.0.0/16 to 10.10.10.0/24 until the subset consists of the single node 10.10.10.10/32. A historical baseline model similar to the model 350 illustrated in FIG. 4 is computed for each domain (omitting groups which are administratively set to be ignored due to their irrelevancy in classification or excessive granularity; these are nontechnical distinctions related to a specific deployment). A probabilistic anomaly detection process, such as the process 500 of FIG. 5, utilizes the baseline model to evaluate each domain to detect an anomaly, such as a brute force intrusion attack. The groups or domains for which an anomaly is detected are termed the locus of the anomaly.

The locus of the anomaly delineates the potential scope of the attack. For example, the classifications of examples 600 and 620 above (and in particular the subnet classification) are natural since they mirror the way an attacker typically groups nodes for an attack. To address other types of threats, classifier domains may be chosen according to relevant node groupings, such as divisions, departments, and teams. Since classifier domains are effectively potential loci of threat focus, they are preferably set up and constrained accordingly. The detector process, e.g. process 500, will then indicate, for an event, which, if any, of the loci are likely under attack.

Figure 7:
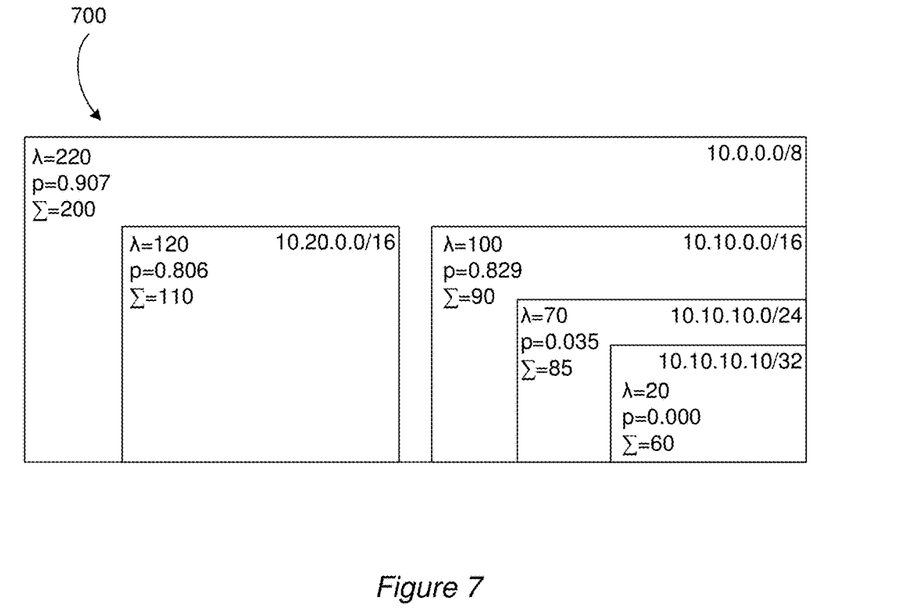
FIG. 7 is a schematic diagram depicting one example of a hierarchy of domains with examples of the instantaneous values for historical data similar to one of the classifier domain examples of FIG. 6 demonstrating data used in certain aspects of the present invention.

FIG. 7 illustrates one hypothetical example of a hierarchy of domains with an example of the instantaneous values based on hypothetical historical data for the example 600 of FIG. 6. $\Sigma$ denotes the running total of events within the corresponding domain in the current period. $\lambda$ denotes the expected rate for that domain and period. An alternative domain 10.20.0.0/16 has been added to the example 600 and shown at only the second level for purposes of comparison. Note that both the λ-values and Σ-values for the 10.20.0.0/16 and 10.10.0.0/24 domains sum to their counterparts in their immediate superior domain 10.0.0.0/8, e.g. the Σ-value for domain 10.0.0.0/8 of 200 includes the Σ-value 110 for subdomain 10.20.0.0/16 and the Σ-value of 85 for subdomain 10.10.10.0/24. For demonstration, these are the only subdomains of 10.0.0.0/8 that are illustrated here and other domains may exist that could be addressed in a similar manner. Note also that both these values are strictly less than the corresponding values in the superior node, if any, e.g. 110+85<200. A comparison of the values for the example of FIG. 7 indicates that the locus of attack is the 10.10.10.10/32 domain, comprised of one node, with some indication in the data that the immediately superior domain 10.10.10.0/24 may also be targeted.

The p-values shown in FIG. 7 are derived from the Poisson distribution. They represent the probability that there should be at least as many events seen as were in fact seen within the period (x≥λ). Given an alpha value of α=0.02, only the 10.10.10.10/32 domain indicates an anomaly. Since it is clear that 10.10.10.10/32 has an anomalous number of crashes over the period, a brute-force attack is inferred.

Figure 8:
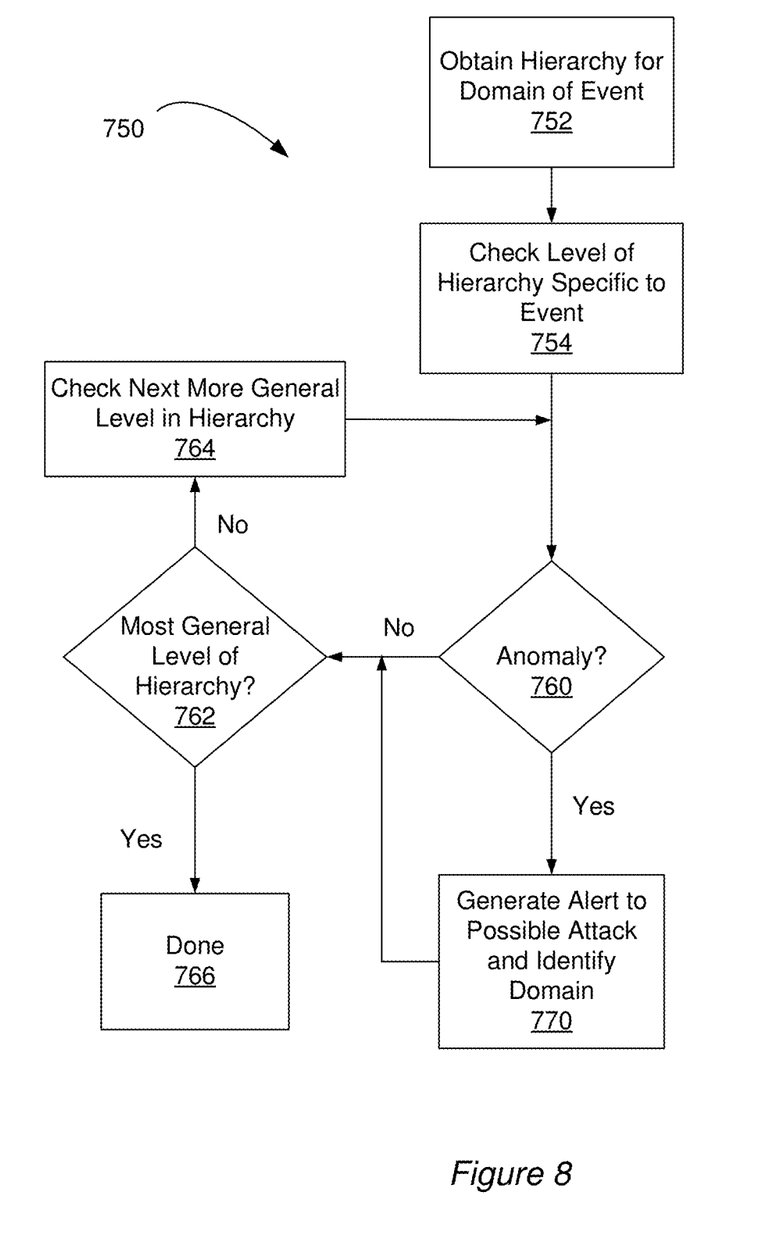
FIG. 8 is a control flow diagram illustrating the steps or stages of an exemplary process for checking a hierarchy of domains, such as the hierarchy of domains shown in FIG. 7, for one or more anomalies in accordance with certain aspects of the present invention.

FIG. 8 illustrates one example of a process 750 for checking a hierarchy of domains, such as the hierarchy 700 in FIG. 7, for one or more anomalies starting at a level of the hierarchy specific to the event and proceeding to progressively more general levels of the hierarchy. In the example of FIG. 8, process 750 is invoked responsive to a failure event in a domain. At step 752, a hierarchy of historical data, such as hierarchy 700 of FIG. 7, is obtained that corresponds to the domain of the event. At step 754, analysis of the event begins at the level of the hierarchy corresponding to the event, e.g. 10.10.10.10/32, to determine whether the event is an anomaly, such as process 500 in FIG. 5. If no anomaly is detected, e.g. the value of p is greater than the alpha value, then control flow branches at step 760 to step 762, where it is determined whether the most general level of the hierarchy has been reached. If there is more than one level of domain in the hierarchy, then control branches to step 764 where the next most general level in the hierarchy is checked for an anomaly, e.g. 10.10.10.0/24 is checked next, then 10.10.0.0/16 and finally 10.0.0.0/8. If the most general level of the hierarchy is reached, then, in this example, control branches at step 762 to 766, where the process is complete because all levels of the hierarchy starting from the level of the event have been checked. As a result, the occurrence of a failure event in a domain will result in the hierarchy corresponding to the domain being checked from the level specific to the event up to the topmost or most general level in order to locate a domain within the hierarchy whose data indicates an anomaly possibly related to an attack.

If an anomaly is detected, i.e. the value of p for the domain is less than or equal to the alpha value, then control branches at step 760 to step 770 to generate an alert indicating a possible attack and identify the domain under attack. Examples of actions that may be undertaken at step 770 based on this data may include: alerting a network administrator; isolating a network segment; or directing security software to scrutinize the affected segment. The mere existence of an anomalous number of crashes from some segment does not necessarily indicate malicious activity, but it does indicate that an attack may be in progress so that further scrutiny or action may be undertaken. In one embodiment, the process may be complete once the alert is generated, e.g. control branches to step 766 from step 770.

In the example of process 750, control flow branches to step 762 to check the rest of the hierarchy in order to identify the locus of the attack. The next more general level of the hierarchy would be checked for an anomaly at step 764, which is reported, and processing continues up to the highest or most general level of the hierarchy indicating an anomaly.

The present system may be adapted to provide different or additional functionality. Calculations are regularly performed for all the domains in a hierarchy, so that it may be possible to scope an attack more generally than the momentary case of one event. Searching from less-specific domains to more-specific ones localizes the instantaneous scope of an attack. Looking at all of the domains may provide a status of the areas having high failure activity or identify domains that are currently experiencing anomalies. In another embodiment, for example, the domains are subnet A, hosts A1, A3, and A4, e.g. three of four hosts within a subnet A, and the defined group of all web-facing Internet servers running software Q, which, in this example, contains hosts A1, A3, and A4 as well as other hosts. If a failure event occurs in host A1, then the alert produced may indicate that host A1 is under attack, since the alert is event-associative. If the failure event isn't an anomaly on host A1, but analysis shows that the event is an anomaly for subnet A, then the alert may indicate that subnet A is the primary locus of the attack. However, certain embodiments may provide a view of the overall status of the system that would indicate the current anomalies in an event-independent manner, e.g. a running total, to provide administrators with, for example, a real-time high level view of failure events across all the domains in a system.

Note that embodiments of certain aspects of the present invention may adapt to changing activity levels. If, over time, an anomaly is consistent and is not the result of malicious activity, then that anomaly will gradually be incorporated into the baseline. Also, periods or strata may be delineated such that the anomaly is suitably bounded in accordance with the real circumstances. Alternatively, in some embodiments, when a change occurs in the use of the system being analyzed that will invalidate the baseline, manual intervention may be used to reset the baseline data. The subsequent incidence of new data resultant from the new use of the system will cause the baseline to be recomputed, and anomalies will be detected without reference to the previous baseline data.

In some embodiments, the baseline may be computed continuously through the progressive addition of non-malicious event points, e.g. the incidence of non-malicious crash artifacts. There is no training phase and the baseline may be constructed on-demand, though it is possible to cache the baseline data in other embodiments.

In accordance with at least one embodiment of the invention, the system, apparatus, methods, processes and/or operations described herein may be wholly or partially implemented in the form of a set of instructions executed by one or more programmed computer processors, such as a central processing unit (CPU) or microprocessor. Such processors may be incorporated in an apparatus, server, client or other computing device operated by, or in communication with, other components of the system. In accordance with another embodiment of the invention, the system, apparatus, methods, processes and/or operations described herein may be wholly or partially implemented in the form of a set of processor executable instructions stored on persistent storage media.

Figure 9:
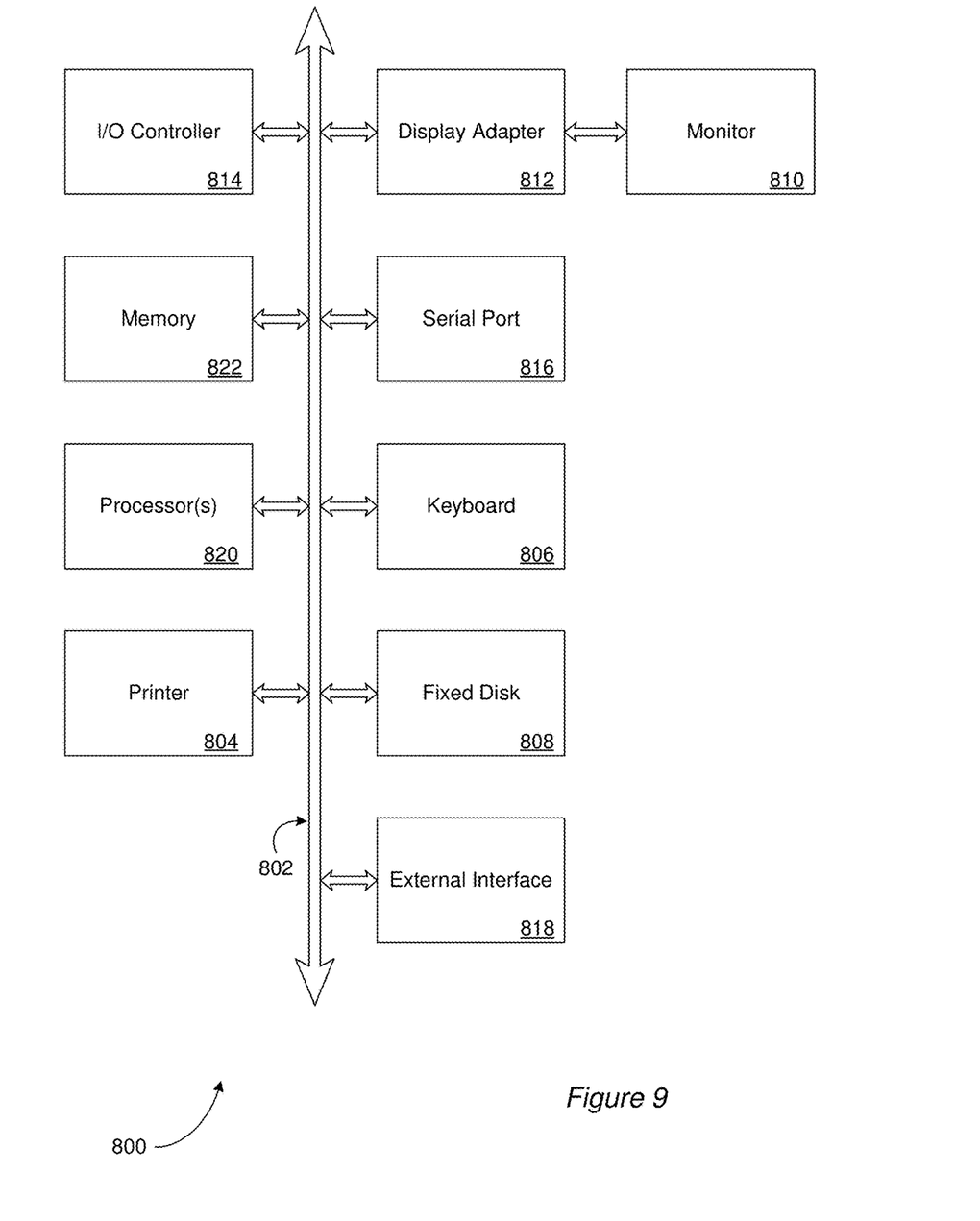
FIG. 9 depicts aspects of elements that may be present in a computer device and/or system configured to implement a method, system and/or process in accordance with some embodiments of the present invention.

FIG. 9 depicts aspects of elements that may be present in one example of a computer device and/or system 800 configured to implement at least some elements of a method, system and/or process in accordance with some embodiments of the present invention. The subsystems shown in FIG. 9 are interconnected via a system bus 802. Additional subsystems include a printer 804, a keyboard 806, a fixed disk 808, and a monitor 810, which is coupled to a display adapter 812. Peripherals and input/output (I/O) devices, which couple to an I/O controller 814, can be connected to the computer system by any number of means known in the art, such as a serial port 816. For example, the serial port 816 or an external interface 818 can be utilized to connect the computer device 800 to further devices and/or systems not shown in FIG. 9 including a wide area network such as the Internet, a mouse input device, and/or a scanner. The interconnection via the system bus 802 allows one or more processors 820 to communicate with each subsystem and to control the execution of instructions that may be stored in a system memory 822 and/or the fixed disk 808, as well as the exchange of information between subsystems. The system memory 822 and/or the fixed disk 808 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl or using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM, where the code is persistently stored sufficient for a processing device to access and execute the code at least once. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components or steps depicted in the drawings or described above, as well as components and steps not shown or described, are possible without departing from the scope of the invention. Similarly, some features and subcombinations are useful and may be employed without reference to other features and subcombinations. Embodiments of the invention have been described for illustrative and not restrictive purposes, and alternative embodiments will be apparent to one of ordinary skill in the art. Accordingly, the present invention is not limited to the embodiments described above or depicted in the drawings, and various embodiments and modifications can be made without departing from the scope of the invention.

We claim:

1. A system for detecting potential attacks on a domain, the system comprising one or more servers configured as follows:

in response to a failure event, obtain by the one or more servers a lambda value from a baseline model of historical data associated with a current time interval corresponding to the failure event;

determine by the one or more servers a probability of whether a total count of failure events for the current time interval is within an expected range using a cumulative density function based on the lambda value;

identify by the one or more servers a possible malicious attack if the probability is less than or equal to a selected alpha value;

obtain by the one or more servers a hierarchical domain model corresponding to a domain affected by the failure event;

traverse by the one or more servers the hierarchical domain model from a first level towards a second level, where the second level is less specific than the first level, and, for each level of the hierarchical domain model, determine the probability of whether the total count of failure events for the current time interval and the current level of the hierarchical domain model is within the expected range using the cumulative density function based on the lambda value; and identify by the one or more servers at least one level of the hierarchical domain as a locus of the potential malicious attack.

2. The system of claim 1, the system is further configured to permit data in the baseline model of historical data to be set to predetermined values.

3. The system of claim 1, wherein the system is further configured to create the baseline model of historical data from event logs and allocate failure events from the logs to a corresponding stratum of the baseline model.

4. The system of claim 3, where the strata are selected to correspond to time intervals having similar recurring levels of failure events.

5. The system of claim 1, wherein the baseline model of historical data is updated in response to failure events.

6. A method for detecting potential attacks on a domain, the method implemented in one or more computers and comprising the steps of:

in response to a failure event, obtain by the one or more computers a lambda value from a baseline model of historical data associated with a current time interval corresponding to the failure event;

determine by the one or more computers a probability of whether a total count of failure events for the current time interval is within an expected range using a cumulative density function based on the lambda value;

identify by the one or more computers a possible malicious attack if the probability is less than or equal to a selected alpha value;

obtaining by the one or more computers a hierarchical domain model corresponding to a domain affected by the failure event;

traversing by the one or more computers the hierarchical domain model from a first level towards a second level, where the second level is less specific than the first level, and, for each level of the hierarchical domain model, determine the probability of whether the total count of failure events for the current time interval and the current level of the hierarchical domain model is within the expected range using the cumulative density function based on the lambda value; and identifying by the one or more computers at least one level of the hierarchical domain as a locus of the potential malicious attack.

7. The method of claim 6, the method further including the step of setting data in the baseline model of historical data to predetermined values.

8. The method of claim 6, the method further including the step of creating the baseline model of historical data from event logs and allocate failure events from the logs to a corresponding stratum of the baseline model.

9. The method of claim 8, the method further including the step of selecting the stratum of the baseline model to correspond to time intervals having similar recurring levels of failure events.

10. The method of claim 6, the method further including the step of updating the baseline model of historical data in response to failure events.

11. The method of claim 6, the method further including the steps of:

obtaining a hierarchical domain model corresponding to a domain affected by the failure event; and traversing the hierarchical domain model from a first level towards a second level, where the second level is more specific than the first level, and, for each level of the hierarchical domain model, determine the probability of whether the total count of failure events for the current time interval and the current level of the hierarchical domain model is within the expected range using the cumulative density function based on the lambda value.

12. The method of claim 11, the method further including the step of identifying at least one level of the hierarchical domain as a locus of the potential malicious attack.

13. The method of claim 11, the method further including the step of displaying the failure events and probability of whether the total count of failure events is within the expected range for multiple levels of the hierarchical domain.

14. A non-transitory computer readable medium storing computer code configured to a cause a processing device to operate to detect potential attacks on a domain as follows:

in response to a failure event, obtain a lambda value from a baseline model of historical data associated with a current time interval corresponding to the failure event;

determine a probability of whether a total count of failure events for the current time interval is within an expected range using a cumulative density function based on the lambda value;

identify a possible malicious attack if the probability is less than or equal to a selected alpha value;

obtaining a hierarchical domain model corresponding to a domain affected by the failure event;

traversing the hierarchical domain model from a first level towards a second level, where the second level is less specific than the first level, and, for each level of the hierarchical domain model, determine the probability of whether the total count of failure events for the current time interval and the current level of the hierarchical domain model is within the expected range using the cumulative density function based on the lambda value; and identifying at least one level of the hierarchical domain as a locus of the potential malicious attack.

15. The persistent computer readable medium of claim 14, the medium further including computer code configured to cause the processing device to further operate to set data in the baseline model of historical data to predetermined values.

16. The persistent computer readable medium of claim 15, the medium further including computer code configured to cause the processing device to further operate to create the baseline model of historical data from event logs and allocate failure events from the logs to a corresponding stratum of the baseline model.

17. The persistent computer readable medium of claim 16, the medium further including computer code configured to cause the processing device to further operate to select the stratum of the baseline model to correspond to time intervals having similar recurring levels of failure events.

18. The persistent computer readable medium of claim 14, the medium further including computer code configured to cause the processing device to further operate to:

obtain a hierarchical domain model corresponding to a domain affected by the failure event; and traverse the hierarchical domain model from a first level towards a second level, where the second level is more specific than the first level, and, for each level of the hierarchical domain model, determine the probability of whether the total count of failure events for the current time interval and the current level of the hierarchical domain model is within the expected range using the cumulative density function based on the lambda value.

* * * * *